US012578259B2

(12) United States Patent
Tahara

(10) Patent No.: US 12,578,259 B2
(45) Date of Patent: Mar. 17, 2026

(54) BIOLOGICAL SAMPLE ANALYZER

(71) Applicant: Sony Group Corporation, Tokyo (JP)

(72) Inventor: Katsutoshi Tahara, Tokyo (JP)

(73) Assignee: Sony Group Corporation, Tokyo (JP)

( * ) Notice: Subject to any disclaimer, the term of this patent is extended or adjusted under 35 U.S.C. 154(b) by 167 days.

(21) Appl. No.: 18/572,343

(22) PCT Filed: Feb. 28, 2022

(86) PCT No.: PCT/JP2022/008132
§ 371 (c)(1),
(2) Date: Dec. 20, 2023

(87) PCT Pub. No.: WO2023/276269
PCT Pub. Date: Jan. 5, 2023

(65) Prior Publication Data
US 2024/0280468 A1     Aug. 22, 2024

(30) Foreign Application Priority Data

Jun. 30, 2021     (JP) ................................. 2021-108449

(51) Int. Cl.
*G01N 15/01*          (2024.01)
*G01N 15/1429*      (2024.01)
(Continued)

(52) U.S. Cl.
CPC .........  *G01N 15/1434* (2013.01); *G01N 15/01* (2024.01); *G01N 15/1429* (2013.01); *G01N 15/149* (2024.01); *G01N 2015/1006* (2013.01)

(58) Field of Classification Search
CPC ............... G01N 15/1434; G01N 15/01; G01N 15/1429; G01N 15/149; G01N 2015/1006; G01N 15/1459; G01N 21/64
See application file for complete search history.

(56) References Cited

U.S. PATENT DOCUMENTS

2003/0067594 A1*   4/2003   Goodwin ............... G01N 21/53
                                                                      356/73
2006/0173266 A1*   8/2006   Pawluczyk ............ G01N 33/58
                                                                      600/407
(Continued)

FOREIGN PATENT DOCUMENTS

JP          S61-128140 A       6/1986
JP          2002-243624 A      8/2002
(Continued)

OTHER PUBLICATIONS

PCT/JP2022/008132, May 24, 2022, International Search Report.
(Continued)

*Primary Examiner* — Edwin C Gunberg
*Assistant Examiner* — Mamadou Faye
(74) *Attorney, Agent, or Firm* — Wolf, Greenfield & Sacks, P.C.

(57)          ABSTRACT

An object of the present technology is to provide a technique for improving detection accuracy in a biological sample analyzer.
The present disclosure relates to a biological sample analyzer including a light irradiation unit that irradiates a particle with light, a detection unit that detects light generated by the light irradiation, and an information processing unit that controls the light irradiation unit and the detection unit. In an embodiment, the information processing unit corrects signal intensity measurement value of light detected by the detection unit on the basis of a relationship between a light irradiation output value of the light irradiation unit and a signal intensity measurement value of the light detected by the detection unit. Furthermore, in an embodiment, the information processing unit is configured to execute a removal process of removing signal intensity data related to a particle group not belonging to a particle population including a plurality of kinds of particle groups (Continued)

having stepwise different fluorescence intensity levels, from signal intensity data of light generated by irradiating a sample including the particle population with light.

15 Claims, 11 Drawing Sheets

(51) Int. Cl.

| | | |
|---|---|---|
| *G01N 15/1434* | (2024.01) | |
| *G01N 15/149* | (2024.01) | |
| *G01N 15/10* | (2006.01) | |

(56) References Cited

U.S. PATENT DOCUMENTS

| | | | |
|---|---|---|---|
| 2009/0186350 A1* | 7/2009 | Guo ................. | G01N 33/54313 506/13 |
| 2010/0314557 A1 | 12/2010 | Hayashi | |
| 2012/0307244 A1* | 12/2012 | Sharpe ............... | G01N 15/1459 250/573 |
| 2013/0107256 A1 | 5/2013 | Mitsuyama et al. | |
| 2016/0161393 A1 | 6/2016 | Tahara | |
| 2019/0355440 A1 | 11/2019 | Ramjeet et al. | |
| 2021/0096077 A1* | 4/2021 | Murai ................ | G01N 21/8483 |
| 2022/0003660 A1* | 1/2022 | Kaiser ............... | G01N 15/0211 |

FOREIGN PATENT DOCUMENTS

| | | | |
|---|---|---|---|
| JP | 2012-021863 A | 2/2012 | |
| JP | 2016-217789 A | 12/2016 | |
| JP | 2019-528680 A | 10/2019 | |
| JP | 2020-027094 A | 2/2020 | |
| JP | 2021-063664 A | 4/2021 | |
| WO | WO-2018014013 A1 | 1/2018 | |
| WO | WO 2021/070847 A1 | 4/2021 | |
| WO | WO 2021/100622 A1 | 5/2021 | |

OTHER PUBLICATIONS

International Search Report and English translation thereof mailed May 24, 2022 in connection with International Application No. PCT/JP2022/008132.

* cited by examiner

Power vs FITC

LIGHT
IRRADIATION UNIT

103

INFORMATION
PROCESSING UNIT

102

DETECTION UNIT

FIG. 6

| STEP No. | VARIABLE | POWER (mW) | SIGNAL INTENSITY MEASUREMENT VALUE | TRUE VALUE CALCULATED USING FIRST-ORDER APPROXIMATION FORMULA (STEP 8) | DIFFERENCE RATE BETWEEN SIGNAL MEASUREMENT VALUE AND TRUE VALUE | CORRECTED VALUE BY THIRD-ORDER APPROXIMATION FORMULA (STEP 9) | DIFFERENCE RATE BETWEEN TRUE VALUE AND CORRECTED VALUE |
|---|---|---|---|---|---|---|---|
| 1 | - | 60 | 899933 | 986075 | 9.10% | 986075 | 0.00% |
| (VERIFICATION MEASUREMENT) | - | 50 | 765890 | 821580 | 7.00% | 828134 | 0.80% |
| (VERIFICATION MEASUREMENT) | - | 40 | 616224 | 657086 | 6.40% | 657846 | 0.10% |
| 2 | a=3 | 20 | 313452 | 328098 | 4.60% | 328098 | 0.00% |
| (VERIFICATION MEASUREMENT) | - | 16 | 252600 | 262300 | 3.80% | 263524 | 0.50% |
| (VERIFICATION MEASUREMENT) | - | 7 | 110672 | 114255 | 3.20% | 114255 | 0.00% |
| 3 | b=10 | 6 | 94955 | 97806 | 3.00% | 97808 | 0.00% |
| (VERIFICATION MEASUREMENT) | - | 3 | 47870 | 48457 | 1.20% | 48598 | 0.30% |
| 4 | c=30 | 2 | 31980 | 32008 | 0.10% | 32008 | 0.00% |
| 5 | d=2 | 1 | 15642 | - | - | - | - |
| 6 | e=4 | 0.5 | 7278 | - | - | - | - |

470

471

472

BIOLOGICAL SAMPLE ANALYZER

CROSS-REFERENCE TO RELATED APPLICATIONS

This application claims the benefit under 35 U.S.C. § 371 as a U.S. National Stage Entry of International Application No. PCT/JP2022/008132, filed in the Japanese Patent Office as a Receiving Office on Feb. 28, 2022, which claims priority to Japanese Patent Application Number JP2021-108449, filed in the Japanese Patent Office on Jun. 30, 2021, each of which is hereby incorporated by reference in its entirety.

TECHNICAL FIELD

The present disclosure relates to a biological sample analyzer. More specifically, the present disclosure relates to a biological sample analyzer including a light irradiation unit that irradiates a biological particle contained in a biological sample with light and a detection unit that detects light generated by the light irradiation.

BACKGROUND ART

For example, a particle population such as cells, microorganisms, and liposomes is labeled with a fluorescent dye, and the intensity and/or pattern of fluorescence generated from the fluorescent dye excited by irradiating each particle of the particle population with laser light is measured, thereby measuring the characteristics of the particles. As a representative example of a particle analyzer that performs the measurement, a flow cytometer can be mentioned.

The flow cytometer is a device that irradiates particles flowing in a line in a flow channel with laser light (excitation light) having a specific wavelength and detects fluorescence and/or scattered light emitted from each particle to analyze a plurality of particles one by one. The flow cytometer can convert light detected by the photodetector into an electrical signal, quantify the electrical signal, and perform statistical analysis to determine characteristics, for example, the type, size, structure, and the like of each particle.

Before the analysis of the biological sample is performed by the flow cytometer, for example, calibration of a laser light source, a photodetector, and the like is performed. Several methods related to the calibration have been proposed so far. For example, Patent Document 1 below discloses an information processing apparatus including an information processing unit that acquires a plurality of fluorescence intensities on the basis of fluorescence signals from a sample including a plurality of particles labeled with fluorescent dyes having different fluorescence intensities, recognizes an intensity range for each of the plurality of fluorescence intensities detected on the basis of a fluorescence intensity ratio of the sample, and calculates information associated with information regarding sensitivity of a fluorescence detection unit.

CITATION LIST

Patent Document

Patent Document 1: Japanese Patent Application Laid-Open No. 2016-217789

SUMMARY OF THE INVENTION

Problems to be Solved by the Invention

In a biological sample analyzer such as a flow cytometer, a photodiode such as a multi-pixel photon counter (MPPC) may be adopted as a photodetector. It is required that there is linearity between the amount of incident light incident on the photodetector and the output value of the detector. However, depending on the amount of incident light, the linearity may be deteriorated. In order to improve the detection accuracy, it is desirable to eliminate the deterioration.

Furthermore, in order to enhance the detection accuracy of the biological sample analyzer such as a flow cytometer, a verification or adjustment process using beads configured to form a predetermined peak is performed. For example, the verification or adjustment process of a detection system using 8-peak beads is performed. However, in a case where the verification or adjustment process of the detection system is performed in a state where other types of beads remain in the device, the other types of beads may affect the process. In order to improve the detection accuracy, it is desirable to remove the influence.

An object of the present disclosure is to solve at least one of these problems.

Solutions to Problems

The present disclosure provides a biological sample analyzer including:

a light irradiation unit that irradiates a particle with light;

a detection unit that detects light generated by the light irradiation; and an information processing unit that controls the light irradiation unit and the detection unit, in which the information processing unit corrects a signal intensity measurement value of the light detected by the detection unit on the basis of a relationship between a light irradiation output value of the light irradiation unit and a signal intensity measurement value of the light detected by the detection unit.

The information processing unit may be configured to execute the correction using an n-th order approximation formula indicating the relationship, and n in the n-th order approximation formula may be an odd number equal to or greater than 3.

The information processing unit may create a first-order approximation formula indicating a relationship between a light irradiation output value equal to or less than a predetermined value and a signal intensity measurement value acquired in a case of the light irradiation output value, and acquire a data group for generating the n-th order approximation formula using the first-order approximation formula.

The information processing unit may acquire a correlation index of the first-order approximation formula.

The information processing unit may determine whether or not the correlation index satisfies a predetermined condition.

The information processing unit may generate the n-th order approximation formula by using a data group including a pair of the signal intensity measurement value acquired in the case of the light irradiation output value equal to or greater than the predetermined value and a signal intensity calculation value calculated by substituting the light irradiation output value into the first-order approximation formula.

The information processing unit may determine whether to correct the signal intensity measurement value using a signal intensity calculation value calculated using the first-order approximation formula as a threshold value in a case where the light irradiation output value is the predetermined value.

The detection unit may include one or more MPPCs as detectors that detect the light.

Furthermore, the present disclosure also provides a biological sample analyzer including:

a detection unit that detects light generated by irradiating a particle with light; and an information processing unit that processes signal intensity data of the light detected by the detection unit, in which the information processing unit is configured to execute a removal process of removing signal intensity data related to a particle group not belonging to a particle population including a plurality of kinds of particle groups having stepwise different fluorescence intensity levels, from signal intensity data of light generated by irradiating a sample including the particle population with light, and in the removal process, the information processing unit executes a setting process of setting two or more of a plurality of photodetectors included in the detection unit as a fluorescence channel used to specify a particle group not belonging to the particle population.

The information processing unit may execute the setting process of the fluorescence channel such that a fluorescence intensity level of the particle group not belonging to the particle population becomes greater than any fluorescence intensity level of the plurality of kinds of particle groups included in the particle population.

In the removal process, the information processing unit may execute a specifying process of specifying signal intensity data related to a particle group having a maximum fluorescence intensity level among the plurality of kinds of particle groups constituting the particle population, from the signal intensity data acquired by the fluorescence channel.

In the specifying process, the information processing unit may specify a signal intensity output value with a maximum number of events among the signal intensity data related to the particle group having the maximum fluorescence intensity level.

In the specifying process, the information processing unit may specify signal intensity data related to the particle group having the maximum fluorescence intensity level on the basis of the signal intensity output value with the maximum number of events.

In the removal process, the information processing unit may set a removal condition for removing signal intensity data related to the particle group not belonging to the particle population on the basis of the signal intensity data related to the particle group having the maximum fluorescence intensity level.

The information processing unit may set the removal condition on the basis of a maximum value of the signal intensity output value among the signal intensity data related to the particle group having the maximum fluorescence intensity level.

The information processing unit may further execute a setting process of setting two or more of the plurality of photodetectors included in the detection unit as a fluorescence channel used to evaluate signal intensity data after the removal process is executed.

The information processing unit may execute a separation and identification process on the signal intensity data after the removal process is executed, by a k-means method.

BRIEF DESCRIPTION OF DRAWINGS

FIG. 3 is a diagram illustrating an example of a block diagram of the biological sample analyzer according to the present disclosure.

FIG. 6 is a table illustrating data acquired in an n-th order approximation formula generation process of an example.

MODE FOR CARRYING OUT THE INVENTION

Hereinafter, preferred modes for carrying out the present disclosure will be described. Note that embodiments described below illustrate representative embodiments of the present disclosure, and the scope of the present disclosure is not limited only to these embodiments. Note that the present disclosure will be described in the following order.

1. First embodiment (biological sample analyzer)
   (1) Configuration example
   (2) Linearity correction
   (2-1) Basic concept of linearity correction
   (2-2) Flow of n-th order approximation formula generation process
   (2-3) Flow of correction process using n-th order approximation formula
   (2-4) Example of generation process of n-th order approximation formula and correction process using approximation formula
   (3) Carryover removal
   (3-1) Basic concept of carryover removal
   (3-2) Flow of detection unit evaluation process including carryover removal process (3-3) Specific example of detection unit evaluation
   process including carryover removal process
(4) Mode in which (2) and (3) described above are
   executed 1. First Embodiment (Biological Sample Analyzer)

(1) Configuration Example

Figure 1:
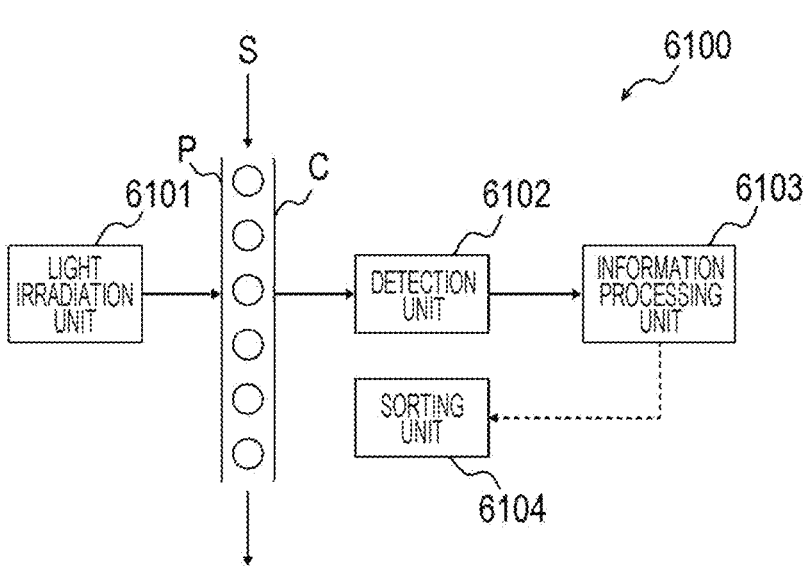
FIG. 1 is a view illustrating a configuration example of a biological sample analyzer of the present disclosure.

FIG. 1 illustrates a configuration example of a biological
sample analyzer of the present disclosure. A biological
sample analyzer 6100 illustrated in FIG. 1 includes a light
irradiation unit 6101 that irradiates a biological sample S
flowing through a flow channel C with light, a detection unit
6102 that detects light generated by irradiating the biological
sample S with light, and an information processing unit 6103
that processes information associated with information
regarding the light detected by the detection unit. The
biological sample analyzer 6100 is a flow cytometer or an
imaging cytometer, for example. The biological sample
analyzer 6100 may include a sorting unit 6104 that sorts out
specific biological particles P in a biological sample. The
biological sample analyzer 6100 including the sorting unit is
a cell sorter, for example.
(Biological Sample)
   The biological sample S may be a liquid sample contain-
ing biological particles. The biological particles are cells or
non-cellular biological particles, for example. The cells may
be living cells, and more specific examples thereof include
blood cells such as erythrocytes and leukocytes, and germ
cells such as sperms and fertilized eggs. Also, the cells may
be those directly collected from a sample such as whole
blood, or may be cultured cells obtained after culturing. The
non-cellular biological particles are extracellular vesicles, or
particularly, exosomes and microvesicles, for example. The
biological particles may be labeled with one or more label-
ing substances (such as a dye (particularly, a fluorescent dye)
and a fluorochrome-labeled antibody). Note that particles
other than biological particles may be analyzed by the
biological sample analyzer of the present disclosure, and
beads or the like may be analyzed for calibration or the like.
(Flow Channel)
   The flow channel C is designed so that a flow of the
biological sample S is formed. In particular, the flow channel
C may be designed so that a flow in which the biological
particles contained in the biological sample are aligned
substantially in one row is formed. The flow channel struc-
ture including the flow channel C may be designed so that
a laminar flow is formed. In particular, the flow channel
structure is designed so that a laminar flow in which the flow
of the biological sample (a sample flow) is surrounded by the
flow of a sheath liquid is formed. The design of the flow
channel structure may be appropriately selected by a person
skilled in the art, or a known one may be adopted. The flow
channel C may be formed in a flow channel structure such
as a microchip (a chip having a flow channel on the order of
micrometers) or a flow cell. The width of the flow channel
C is 1 mm or smaller, or particularly, may be not smaller
than 10 μm and not greater than 1 mm. The flow channel C
and the flow channel structure including the flow channel C
may be made of a material such as plastic or glass.
   The biological sample analyzer of the present disclosure
is designed so that the biological sample flowing in the flow
channel C, or particularly, the biological particles in the
biological sample are irradiated with light from the light
irradiation unit 6101. The biological sample analyzer of the
present disclosure may be designed so that the irradiation point of light on the biological sample is located in the flow
channel structure in which the flow channel C is formed, or
may be designed so that the irradiation point is located
outside the flow channel structure. An example of the former
case may be a configuration in which the light is emitted
onto the flow channel C in a microchip or a flow cell. In the
latter case, the biological particles after exiting the flow
channel structure (particularly, the nozzle portion thereof)
may be irradiated with the light, and a flow cytometer of a
jet-in-air type can be adopted, for example.
(Light Irradiation Unit)
   The light irradiation unit 6101 includes a light source unit
that emits light, and a light guide optical system that guides
the light to the irradiation point. The light source unit
includes one or more light sources. The type of the light
source (s) is a laser light source or an LED, for example. The
wavelength of light to be emitted from each light source may
be any wavelength of ultraviolet light, visible light, and
infrared light. The light guide optical system includes optical
components such as beam splitters, mirrors, or optical fibers,
for example. The light guide optical system may also include
a lens group for condensing light, and includes an objective
lens, for example. There may be one or more irradiation
points at which the biological sample and light intersect. The
light irradiation unit 6101 may be designed to collect light
emitted onto one irradiation point from one light source or
different light sources.
(Detection Unit)
   The detection unit 6102 includes at least one photodetec-
tor that detects light generated by emitting light onto bio-
logical particles. The light to be detected may be fluores-
cence or scattered light (such as one or more of the
following: forward scattered light, backscattered light, and
side scattered light), for example. Each photodetector
includes one or more light receiving elements, and has a
light receiving element array, for example. Each photode-
tector may include one or more photomultiplier tubes
(PMTs) and/or photodiodes such as APDs and MPPCs, as
the light receiving elements. The photodetector includes a
PMT array in which a plurality of PMTs is arranged in a
one-dimensional direction, for example. The detection unit
6102 may also include an image sensor such as a CCD or a
CMOS. With the image sensor, the detection unit 6102 can
acquire an image (such as a bright-field image, a dark-field
image, or a fluorescent image, for example) of biological
particles.
   The detection unit 6102 includes a detection optical
system that causes light of a predetermined detection wave-
length to reach the corresponding photodetector. The detec-
tion optical system includes a spectroscopic unit such as a
prism or a diffraction grating, or a wavelength separation
unit such as a dichroic mirror or an optical filter. The
detection optical system is designed to disperse the light
generated by light irradiation to biological particles, for
example, and detect the dispersed light with a larger number
of photodetectors than the number of fluorescent dyes with
which the biological particles are labeled. A flow cytometer
including such a detection optical system is called a spectral
flow cytometer. Further, the detection optical system is
designed to separate the light corresponding to the fluores-
cence wavelength band of a specific fluorescent dye from the
light generated by the light irradiation to the biological
particles, for example, and cause the corresponding photo-
detector to detect the separated light.
   The detection unit 6102 may also include a signal pro-
cessing unit that converts an electrical signal obtained by a
photodetector into a digital signal. The signal processing unit may include an A/D converter as a device that performs the conversion. The digital signal obtained by the conversion performed by the signal processing unit can be transmitted to the information processing unit 6103. The digital signal can be handled as data related to light (hereinafter, also referred to as "light data") by the information processing unit 6103. The light data may be light data including fluorescence data, for example. More specifically, the light data may be data of light intensity, and the light intensity may be light intensity data of light including fluorescence (the light intensity data may include feature quantities such as area, height, and width).

(Information Processing Unit)

The information processing unit 6103 includes a processing unit that performs processing of various kinds of data (light data, for example), and a storage unit that stores various kinds of data, for example. In a case where the processing unit acquires the light data corresponding to a fluorescent dye from the detection unit 6102, the processing unit can perform fluorescence leakage correction (a compensation process) on the light intensity data. In the case of a spectral flow cytometer, the processing unit also performs a fluorescence separation process on the light data, and acquires the light intensity data corresponding to the fluorescent dye. The fluorescence separation process may be performed by an unmixing method disclosed in JP 2011-232259 A, for example. In a case where the detection unit 6102 includes an image sensor, the processing unit may acquire morphological information about the biological particles, on the basis of an image acquired by the image sensor. The storage unit may be designed to be capable of storing the acquired light data. The storage unit may be designed to be capable of further storing spectral reference data to be used in the unmixing process.

In a case where the biological sample analyzer 6100 includes the sorting unit 6104 described later, the information processing unit 6103 can determine whether to sort the biological particles, on the basis of the light data and/or the morphological information. The information processing unit 6103 then controls the sorting unit 6104 on the basis of the result of the determination, and the biological particles can be sorted by the sorting unit 6104.

The information processing unit 6103 may be designed to be capable of outputting various kinds of data (such as light data and images, for example). For example, the information processing unit 6103 can output various kinds of data (such as a two-dimensional plot or a spectrum plot, for example) generated on the basis of the light data. The information processing unit 6103 may also be designed to be capable of accepting inputs of various kinds of data, and accepts a gating process on a plot by a user, for example. The information processing unit 6103 may include an output unit (such as a display, for example) or an input unit (such as a keyboard, for example) for performing the output or the input.

The information processing unit 6103 may be designed as a general-purpose computer, and may be designed as an information processing device that includes a CPU, a RAM, and a ROM, for example. The information processing unit 6103 may be included in the housing in which the light irradiation unit 6101 and the detection unit 6102 are included, or may be located outside the housing. Further, the various processes or functions to be executed by the information processing unit 6103 may be realized by a server computer or a cloud connected via a network.

(Sorting Unit)

The sorting unit 6104 performs sorting of biological particles, in accordance with the result of determination performed by the information processing unit 6103. The sorting method may be a method by which droplets containing biological particles are generated by vibration, electric charges are applied to the droplets to be sorted, and the traveling direction of the droplets is controlled by an electrode. The sorting method may be a method for sorting by controlling the traveling direction of biological particles in the flow channel structure. The flow channel structure has a control mechanism based on pressure (injection or suction) or electric charge, for example. An example of the flow channel structure may be a chip (the chip disclosed in JP 2020-76736 A, for example) that has a flow channel structure in which the flow channel C branches into a recovery flow channel and a waste liquid flow channel on the downstream side, and specific biological particles are collected in the recovery flow channel.

(2) Linearity Correction (2-1) Basic Concept of Linearity Correction

A multi-pixel photon counter (MPPC) is one of SiPMs, and includes a plurality of avalanche photodiodes (APDs) arranged in an array. A unit of each APD is also referred to as a pixel. The MPPC detects photons that have entered all pixels within a detection time.

The number of output pulses from each pixel is one, which is not changed by the number of photons that entered each pixel. That is, even in a case where one photon enters one pixel or two photons enter simultaneously, the number of output pulses is one. Therefore, in a case where two or more photons are incident on one pixel within the detection time, a discrepancy occurs in the linearity relationship between the amount of incident light and the MPPC output, and this is more likely to occur as the amount of incident light increases.

Figure 2:
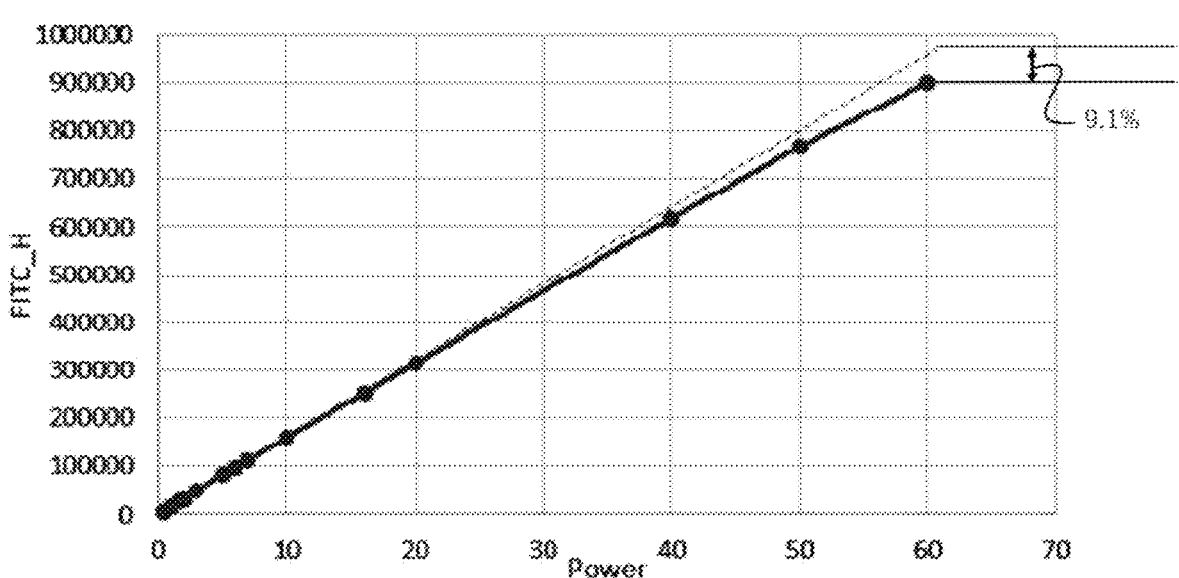
FIG. 2 is a graph for describing deterioration of linearity.

FIG. 2 is a graph for describing deterioration of linearity. In the graph, the horizontal axis represents the laser power, and the vertical axis represents the output value (Height data of the FITC channel). As illustrated in the graph, in a region where the laser power is large, that is, in a region where the amount of incident light is large, the output value is lower than a value based on an assumed linear relationship. For example, in a case where the laser power of the excitation light is 60 mW, the output value is 9.1% lower than the assumed value as illustrated in the figure. As described above, when the amount of incident light increases, linearity deteriorates.

The deterioration of the linearity occurs with a predetermined probability in a certain amount of incident light, and shows the same tendency. Therefore, the deterioration in the linearity can be handled by performing correction based on the data acquired in advance.

The biological sample analyzer device according to the present disclosure includes the information processing unit that corrects the signal intensity measurement value of light detected by the detection unit on the basis of the relationship between the light irradiation output value of the light irradiation unit and the signal intensity measurement value of light detected by the detection unit. Therefore, it is possible to cope with the linearity deterioration in a case where the amount of incident light increases.

The relationship may be obtained, for example, by actually flowing sample beads while changing the laser power to perform a photodetection process, and acquiring an output due to the incident light to the MPPC. The relationship may

US 12,578,259 B2

Figure 3:
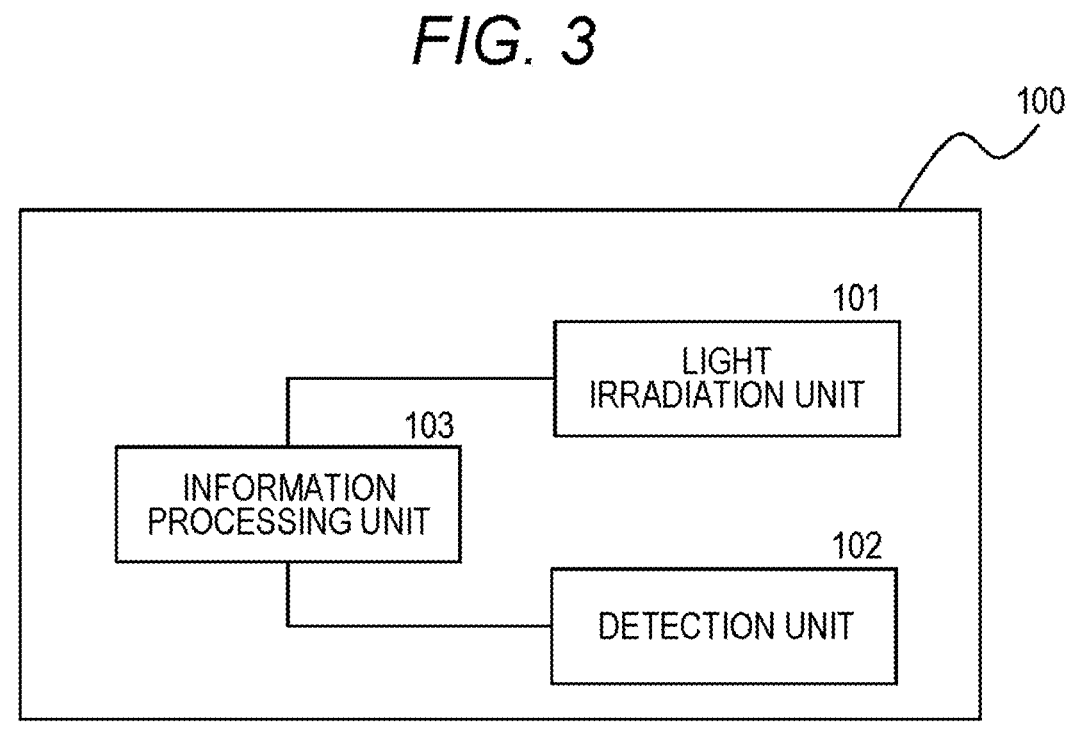
Figure 4:
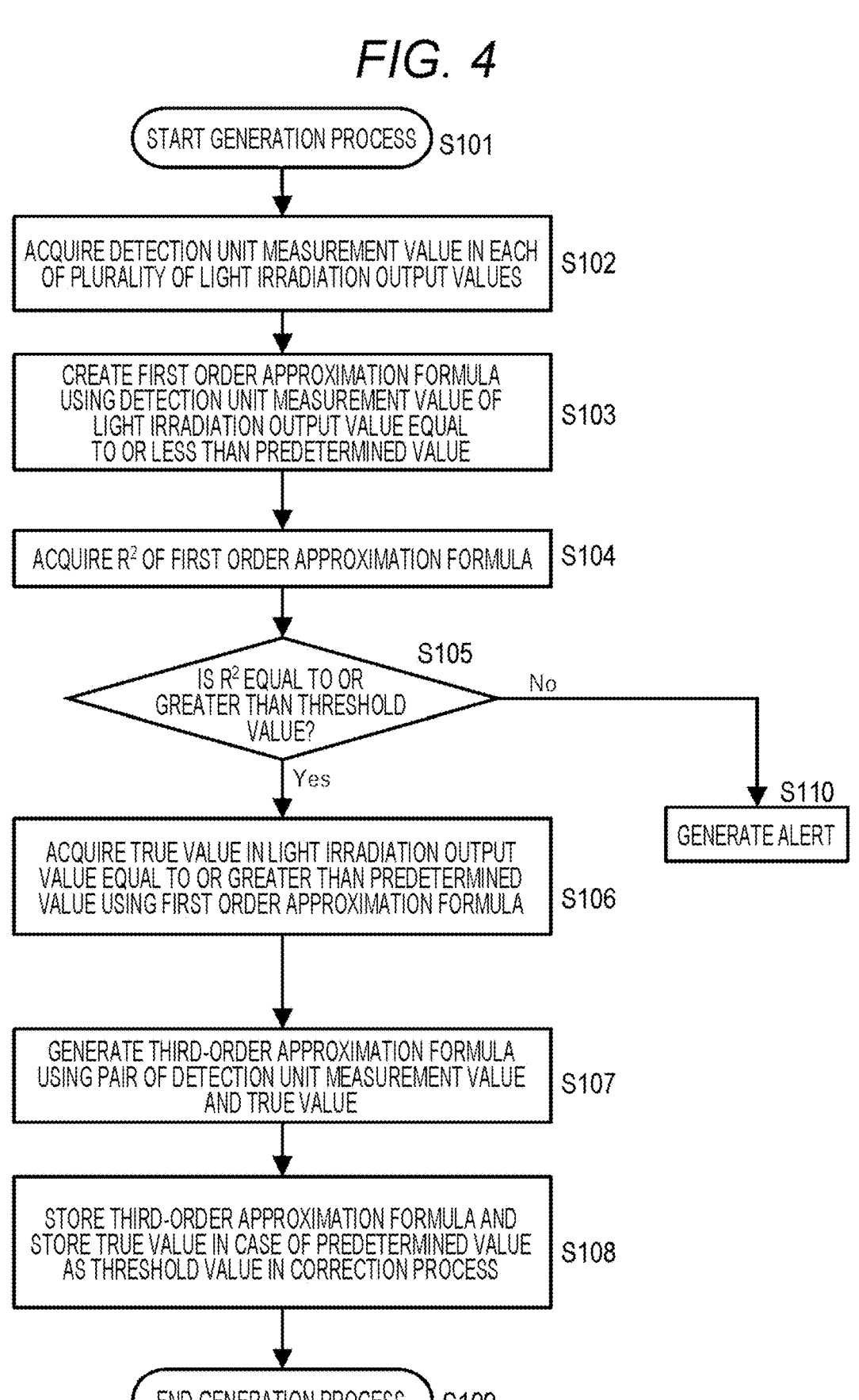
FIG. 4 is an example of a flowchart of a process of acquiring a relationship between a light irradiation output value of a light irradiation unit and a signal intensity measurement value of light detected by a detection unit.

9
10 be expressed by, for example, an approximation formula, particularly an n-th order approximation formula. The generation process of the n-th order approximation formula will be described below in (2-2) with reference to FIGS. 3 and 4. FIG. 3 illustrates an example of a block diagram of the biological sample analyzer according to the present disclosure. FIG. 4 is an example of a flowchart of a process of acquiring the relationship. Furthermore, the correction processing using the n-th order approximation formula will be described below in (2-3) with reference to FIGS. 3 and 5. Moreover, an example of the generation process of the n-th order approximation formula and the correction process using the n-th order approximation formula will be described below in (2-4) with reference to FIG. 5.

The deterioration of the linearity due to the high input to the MPPC depends on the characteristics (for example, shape, size, intensity distribution, and the like) of the incident light to the MPPC. With respect to the biological sample analyzer such as a flow cytometer, the characteristics of the incident light are substantially unchanged in a short period (for example, one analysis), but may be changed in a long term. In order to cope with the change in the characteristics of the incident light, it is desirable to execute the linearity calibration at a predetermined timing. For example, it is conceivable to execute the linearity calibration at a quality control (QC) stage executed before executing the analysis of the biological sample. That is, the biological sample analyzer according to the present disclosure may perform the process of acquiring the relationship, for example, in the QC stage, and may be particularly configured to execute the generation process of the n-th order approximation formula.

(2-2) Flow of n-th Order Approximation Formula Generation Process

A biological sample analyzer 100 illustrated in FIG. 3 includes a light irradiation unit 101 that irradiates a biological particle contained in a biological sample with light, a detection unit 102 that detects light generated by the light irradiation, and an information processing unit 103 that controls the light irradiation unit. The light irradiation unit 101, the detection unit 102, and the information processing unit 103 are the same as the light irradiation unit 6101, the detection unit 6102, and the information processing unit 6103 described in (2) described above.

In the present disclosure, the detection unit 102 preferably includes one or more photodiodes, preferably one or more Si photodiodes, as a detector that detects the light. The one or more photodiodes may include, for example, one or more APDs, one or more MPPCs, or a combination thereof. In one embodiment, the detection unit includes one or more MPPCs as detectors that detect the light. The present disclosure is suitable for solving the above problem that occurs in a case where the detection unit includes such a light receiving element.

In step S101 of the flowchart illustrated in FIG. 4, the information processing unit 103 starts the process of acquiring the relationship between the light irradiation output value of the light irradiation unit and the signal intensity measurement value of light detected by the detection unit. The process may be performed in a device setting stage before the analysis process of the biological sample by the biological sample analyzer is started, and may be performed, for example, in the QC stage. Note that the process may be performed in the middle of the analysis process of the biological sample by the biological sample analyzer.

In step S102, the biological sample analyzer 100 executes the process of acquiring the signal intensity measurement value in each of the plurality of light irradiation output values. For example, the biological sample analyzer 100 executes flow cytometry for the acquisition. By the flow cytometry, the information processing unit 103 acquires the signal intensity measurement value in each of the plurality of light irradiation output values.

For example, in the process, a detection result of fluorescence from predetermined fluorescent beads is acquired. That is, in step S102, the flow cytometry is performed on the predetermined fluorescent beads. The predetermined fluorescent beads are preferably uniform in size and fluorescence intensity, for example. The predetermined fluorescent beads may be beads from which fluorescence in a wavelength range of, for example, 400 nm to 800 nm can be obtained. Examples of such beads include AlignCheck Beads and SortCal Beads (both from Sony Group Corporation), but are not limited thereto.

The plurality of light irradiation output values includes a plurality of values equal to or less than a predetermined value (or less than the predetermined value) and a plurality of values equal to or greater than a predetermined value (or greater than the predetermined value). The predetermined value is a value set such that the linearity deterioration does not occur or can be ignored at the light irradiation output value equal to or less than the predetermined value, and the linearity deterioration occurs at the light irradiation output value exceeding the predetermined value.

As described above, the deterioration of the linearity occurs with a predetermined probability in a certain amount of incident light, and shows the same tendency. That is, the linearity deterioration does not occur in a case where the amount of incident light is low, and the linearity deterioration occurs in a case where the amount of incident light is large. Therefore, the predetermined value can be set in advance.

The signal intensity measurement value acquired in each of the plurality of light irradiation output values equal to or less than the predetermined value is used to generate a first-order approximation formula described later.

That is, in step S102, the information processing unit 103 acquires the signal intensity measurement value acquired in each of two or more light irradiation output values equal to or less than the predetermined value.

Furthermore, the signal intensity measurement value acquired in each of the plurality of light irradiation output values equal to or greater than the predetermined value is used to generate the n-th order approximation formula described later.

That is, in step S102, the information processing unit 103 acquires the signal intensity measurement value acquired in each of (n+1) or more light irradiation output values equal to or less than the predetermined value.

In step S102, the number of events of the fluorescence signal acquired in each case of the plurality of light irradiation output values may be, for example, 500 events to 10,000 events, preferably 1,000 events to 70,000 events, and more preferably 2,000 events to 50,000 events.

The signal intensity measurement value acquired in step S102 may be, for example, the median (Median) or the mean (Mean) of the output of the fluorescence channel.

In a case where the detection unit includes a plurality of light receiving elements (for example, a plurality of APDs or a plurality of MPPCs), each light receiving element may be set as one fluorescence channel. In this case, in step S102, the information processing unit 103 may acquire the signal intensity measurement value for each of one or more fluorescence channels for which the linearity calibration is required. In the present disclosure, the following process of steps S103 to S108 may be performed for each fluorescence channel.

In step S103, the information processing unit 103 creates the first-order approximation formula using a detection unit measurement value of the light irradiation output value equal to or less than the predetermined value.

In step S104, the information processing unit 103 acquires a correlation index of the first-order approximation formula. The correlation index may be, for example, a determination coefficient $R^2$.

In step S105, the information processing unit 103 determines whether the correlation index is equal to or greater than a predetermined threshold value (or greater than the threshold value). The predetermined threshold value may be appropriately set by a person skilled in the art so that validity of the first-order approximation formula can be determined. In a case where the correlation index is the determination coefficient $R^2$, the predetermined threshold value may be, for example, any value of 0.9900 or more, 0.9990 or more, or 0.9995 or more.

In one embodiment, in the same step, the information processing unit 103 determines whether the correlation index is greater than 0.9995 ($R^2 > 0.9995$).

In a case where the correlation index is equal to or greater than the predetermined threshold value (or greater than the threshold value) in step S105, the information processing unit 103 advances the processing to step S106. In a case where the correlation index is less than the predetermined threshold value (or equal to or less than the threshold value), the information processing unit 103 advances the processing to step S110.

In step S110, the information processing unit 103 can generate an alert for notifying the user that, for example, an appropriate first-order approximation formula has not been generated. In addition to generating the alert, the information processing unit 103 may output, to a display device, a screen inquiring the user whether to execute the n-th order approximation formula generation process again, for example.

In step S106, the information processing unit 103 substitutes each of the light irradiation output values equal to or greater than the predetermined value, among the plurality of light irradiation output values into the first-order approximation formula generated in step S103, and acquires a signal intensity calculation value corresponding to each of the light irradiation output values equal to or greater the predetermined value. Therefore, data including a pair of the signal intensity measurement value and the signal intensity calculation value regarding each of the light irradiation output values equal to or greater than the predetermined value is obtained. The data may be associated with each light irradiation output value. Note that the signal intensity calculation value can also be said to be a true value calculated on the basis of assumed linearity.

In step S107, the information processing unit 103 generates the n-th order approximation formula by using a data group including a pair of the signal intensity measurement value acquired in the case of the light irradiation output value equal to or greater than the predetermined value and the signal intensity calculation value calculated by substituting the light irradiation output value into the first-order approximation formula. Here, n may be an odd number of 3 or more. n may be, for example, 3, 5, 7, or 9, and may be particularly 3, 5, or 7, more particularly 3 or 5, or even more particularly 3 in order to reduce the number of data points required.

The number of pairs used to generate the n-th order approximation formula may be appropriately adjusted according to the generated n-th order approximation formula, and may be, for example, n+1 or more. For example, in the case of a third-order approximation formula, at least four pairs are prepared.

As described above, in the present disclosure, the information processing apparatus can create the first-order approximation formula indicating the relationship between the light irradiation output value equal to or less than the predetermined value and the signal intensity measurement value acquired in the case of the light irradiation output value, and can acquire the data group for generating the n-th order approximation formula using the first-order approximation formula.

In step S108, the information processing unit 103 stores the n-th order approximation formula generated in step S107. The n-th order approximation formula is used in a biological sample analysis process performed thereafter.

In step S108, the signal intensity calculation value calculated in a case where the light irradiation output value is the predetermined value is stored as a threshold value used in the correction process to be described later.

In step S109, the information processing unit 103 ends the n-th order approximation formula generation process. After the process is performed, the biological sample analysis is performed using the biological sample analyzer 100. In the biological sample analysis, the correction process described in (2-3) below is executed.

(2-3) Flow of Correction Process Using n-th Order Approximation Formula

Figure 5:
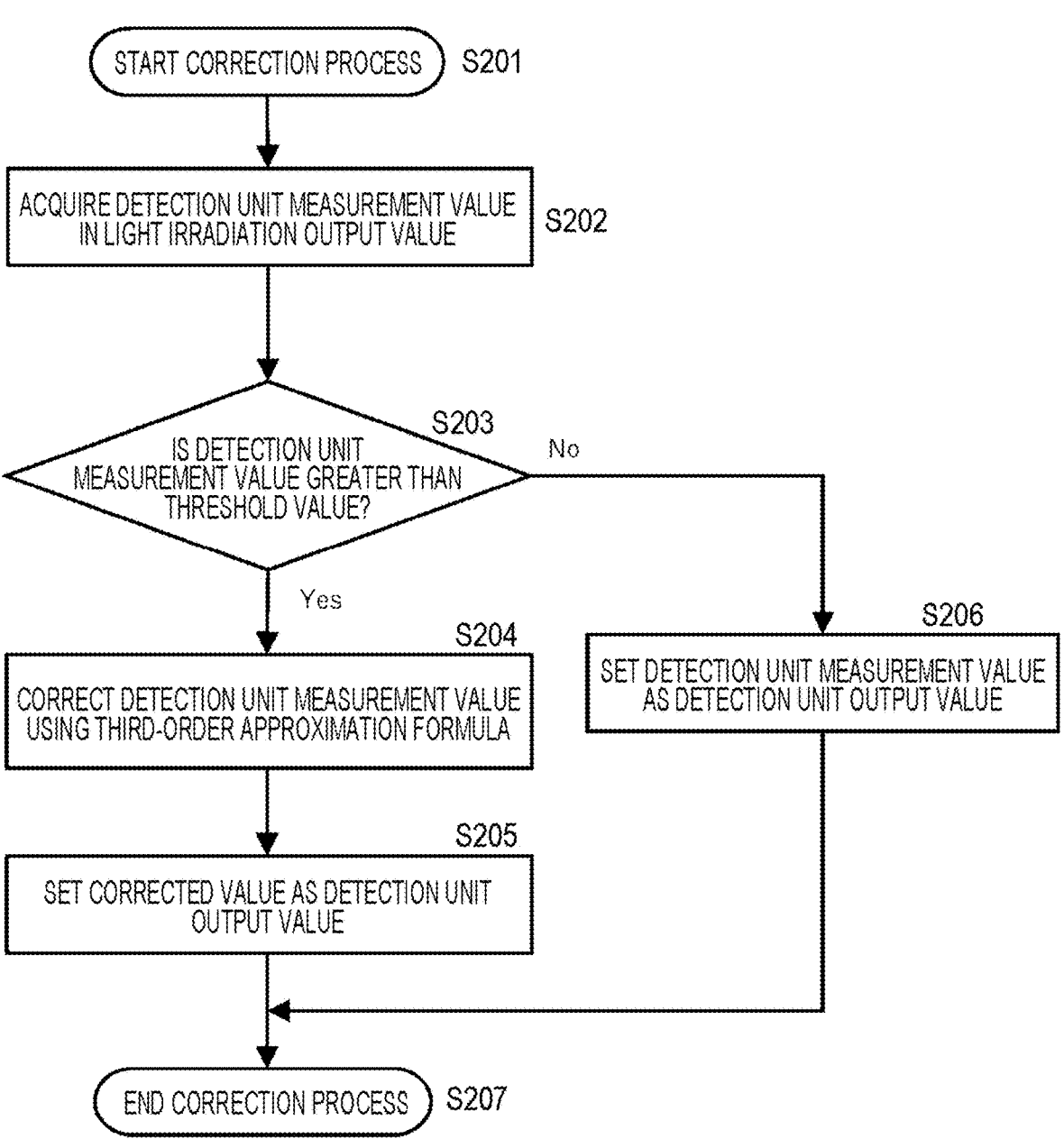
FIG. 5 is an example of a flowchart of a correction process using an n-th order approximation formula.

The biological sample analyzer 100 illustrated in FIG. 3 executes the analysis process of the biological sample. The analysis process may include executing the flow cytometry. In the analysis process, the light irradiation unit 101 irradiates the biological particle included in the biological sample with light. Then, the detection unit 102 detects light generated by the light irradiation. The information processing unit 103 executes the correction process using the n-th order approximation formula on the data (in particular, fluorescence signal intensity data) related to the detected light. FIG. 5 illustrates an example of the flowchart of the correction process.

In step S201 of the flowchart illustrated in FIG. 5, the information processing unit 103 starts the correction process.

In step S202, the information processing unit 103 acquires a measurement value (also referred to as "detection unit measurement value") of the fluorescence signal intensity of the fluorescence detected by the detection unit.

In step S203, the information processing unit 103 determines whether or not the detection unit measurement value is greater than the threshold value described in step S108 described above.

In a case where the detection unit measurement value is greater than the threshold value, the information processing unit 103 advances the processing to step S204.

In a case where the detection unit measurement value is equal to or less than the threshold value, the information processing unit 103 advances the processing to step S206.

As described above, in the present disclosure, the information processing unit can determine whether to correct the signal intensity measurement value using the signal intensity calculation value calculated using the first-order approximation formula as a threshold value in a case where the light irradiation output value is the predetermined value.

In step S204, the information processing unit 103 corrects the detection unit measurement value using the n-th order approximation formula described in step S108 described above. For example, the information processing unit 103 substitutes the detection unit measurement value into the n-th order approximation formula to obtain a corrected measurement value.

In step S205, the information processing unit 103 adopts the corrected measurement value as the output value.

In step S206, the information processing unit 103 adopts the detection unit measurement value as the output value.

In step S207, the information processing unit 103 ends the correction process.

As described in (2-2) described above, in a case where the detection unit includes a plurality of light receiving elements (for example, a plurality of APDs or a plurality of MPPCs), each light receiving element may be set as one fluorescence channel. In this case, the information processing unit 103 executes the process of steps S102 to S108 for each fluorescence channel, and obtains the n-th order approximation formula and the threshold value for each fluorescence channel. The information processing unit 103 can execute the correction process described above for each fluorescence channel using the n-th order approximation formula and the threshold value of each fluorescence channel.

Furthermore, the information processing unit 103 may execute the above correction process for each event.

The fluorescence signal data obtained in this manner is more appropriate data in which the problem of the degradation of the linearity has been solved.

(2-4) Example of Generation Process of n-th Order Approximation Formula and Correction Process Using Approximation Formula Hereinafter, an example of the generation process of the n-th order approximation formula will be described with reference to FIG. 6. The figure illustrates data acquired in the generation process. The generation process was performed using the flow cytometer including the detection unit including the MPPC as the photodetector. The flow cytometer performed the following steps. Note that, in this example, generation of a third-order approximation formula for correcting the output value of the FITC fluorescence channel is described. A third-order approximation formula may be generated similarly for other fluorescence channels.

Step 1. The laser power (light irradiation output value) of the laser light source included in the light irradiation unit of the flow cytometer was set to 60 mW. In the state set in this manner, the analysis process by the flow cytometer was performed on the predetermined fluorescent beads to acquire 3,000 pieces of event data. For these pieces of event data, the median (Median) of the output value of the FITC fluorescence channel was acquired, and the median was used as the signal intensity measurement value.

Step 2. The light irradiation output value and the threshold value of the flow cytometer were set to 1/a of the values in Step 1. Here, a was 3 as illustrated in FIG. 6. After the setting, the analysis process by the flow cytometer was performed on the fluorescent beads to acquire 3,000 pieces of event data. For these pieces of event data, the median of the output value of the FITC fluorescence channel was acquired, and the median was used as the signal intensity measurement value. The measurement values are also illustrated in the figure.

Step 3. The light irradiation output value and the threshold value of the flow cytometer were set to 1/b of the values in Step 1. Here, b was 10 as illustrated in FIG. 6. After the setting, the analysis process by the flow cytometer was performed on the fluorescent beads to acquire 3,000 pieces of event data. For these pieces of event data, the median of the output value of the FITC fluorescence channel was acquired, and the median was used as the signal intensity measurement value.

Step 4. The light irradiation output value and the threshold value of the flow cytometer were set to 1/c of the values in Step 1. Here, c was 30 as illustrated in FIG. 6. After the setting, the analysis process by the flow cytometer was performed on the fluorescent beads to acquire 3,000 pieces of event data. For these pieces of event data, the median of the output value of the FITC fluorescence channel was acquired, and the median was used as the signal intensity measurement value.

Step 5. The light irradiation output value and the threshold value of the flow cytometer were set to 1/d of the values in Step 4. Here, d was 2 as illustrated in FIG. 6. After the setting, the analysis process by the flow cytometer was performed on the fluorescent beads to acquire 3,000 pieces of event data. For these pieces of event data, the median of the output value of the FITC fluorescence channel was acquired, and the median was used as the signal intensity measurement value.

Step 6. The light irradiation output value and the threshold value of the flow cytometer were set to 1/e of the values in Step 4. Here, e was 4 as illustrated in FIG. 6. After the setting, the analysis process by the flow cytometer was performed on the fluorescent beads to acquire 3,000 pieces of event data. For these pieces of event data, the median of the output value of the FITC fluorescence channel was acquired, and the median was used as the signal intensity measurement value.

Step 7. From the measurement results obtained in Steps 4, 5, and 6 described above, the first-order approximation formula between the light irradiation output value (laser power) and the signal intensity measurement value (Median) was generated. Furthermore, the determination coefficient $R^2$ was 0.999965 with respect to the first-order approximation formula. The determination coefficient satisfied the condition of $R^2 > 0.9995$.

Step 8. The laser power set in Steps 1 to 4 was substituted into the first-order approximation formula generated in Step 7 to obtain the signal intensity calculation value at each laser power. These signal intensity calculation values are illustrated as true values in the figure.

Step 9. The third-order approximation formula is generated from the signal intensity measurement value and the signal intensity calculation value in Steps 1 to 4. The third-order approximation formula is adopted as the approximation formula for the correction process. Furthermore, the signal intensity calculation value (true value) in Step 4 is adopted as the threshold value used in the correction process.

Step 10. A biological particle analysis process was performed. In the analysis process, in a case where the signal intensity measurement value is equal to or greater than the threshold value (the signal intensity calculation value calculated in Step 4), the signal intensity measurement value is corrected by the third-order approximation formula generated in Step 9. On the other hand, in a case where the signal intensity measurement value is less than the signal intensity calculation value calculated in Step 4, the correction is not performed.

Note that a, b, c, d, and e mentioned in Steps 2 to 6 described above are set so as to satisfy the following relationship. Setting the light irradiation output value so as to satisfy such a relationship is effective for generating a good n-th order approximation formula and a good first-order approximation formula.

$$1 < a < b < c \text{ and } 1 < d < e$$

Steps 1 to 10 described above are described in more detail below.

It is desirable that the laser power adopted in Step 1 is a value where the fluorescence signal intensity is not saturated and which is in the vicinity where the fluorescence signal intensity is saturated. The laser power adopted in Steps 1 to 3 is large, and in a case where such laser power is adopted, the deterioration of the linearity is concerned. On the other hand, the laser power adopted in Steps 4 to 6 is relatively small, and the deterioration of the linearity is not concerned. Note that the signal intensity at saturation in the fluorescence channel is 1048575.

Therefore, in Step 8, the first-order approximation formula indicating the relationship between the signal intensity measurement value measured in Steps 4 to 6 and the laser power was generated. Note that, in order to generate the first-order approximation formula, the number of data points may be two, but in the above description, the number of data points is three in consideration of measurement variations and the like. Moreover, the validity of the generated first-order approximation formula was determined by $R^2$. The calculated $R^2$ was 0.999965 as described above. Then, the signal intensity calculation value (true value) at the laser power adopted in Steps 4 to 6 was obtained using the first-order approximation formula.

Then, in Step 9, the third-order approximation formula is generated using the signal intensity measurement value and the signal intensity calculation value in Steps 1 to 4.

The third-order approximation formula was used to correct the signal intensity measurement values measured in a case where the laser power was 50, 40, 16, 7, and 3 mW (row of "verification measurements" in FIG. 6). These signal intensity measurement values are equal to or greater than the true value regarding Step 4 among the true values calculated in Step 8.

The corrected values are illustrated in the figure. The difference rate between the true value and the corrected value and the difference rate between the true value and the signal intensity measurement value are also illustrated. For example, the maximum difference rate between the true value and the signal intensity measurement value was 9.1%. On the other hand, the maximum difference rate between the true value and the corrected value was 0.8%. As described above, it can be seen that the difference rate is further reduced by the correction using the third-order approximation formula, and the signal intensity is appropriately corrected.

Furthermore, in a case where the signal intensity measurement value is equal to or greater than 32008, which is the true value in Step 4, the correction using the third-order approximation formula is performed, and in a case where the signal intensity measurement value is less than 32008, the correction is not performed because there is no concern about the linearity with low output. Therefore, it is possible to prevent the unnecessary correction process from being executed, and the processing speed can be increased.

(3) Carryover Removal (3-1) Basic Concept of Carryover Removal

As described above, the verification or adjustment process using several types of beads is performed to improve the detection accuracy of the biological sample analyzer such as a flow cytometer or for quality control (QC).

For example, beads including a plurality of kinds of particle groups having stepwise different fluorescence intensity levels may be used for verification or adjustment of the detection unit. The beads are used, for example, for verification of fluorescence sensitivity of the device, and examples thereof include beads configured to form a plurality of peaks such as 4-peak beads, 6-peak beads, and 8-peak beads. Examples of such beads include 8 Peak Beads (Sony Group Corporation) used for verification of fluorescence sensitivity.

Furthermore, in addition to the beads for fluorescence sensitivity verification, for example, other beads such as alignment beads or focus adjustment beads of the device are also used. Examples of such beads include AlignCheck Beads (Sony Group Corporation) used for adjustment or state confirmation of the device.

In a case where the verification or adjustment process using the beads for fluorescence sensitivity verification is performed in a state where the other beads remain in the device, the other beads may affect the process. In order to improve the detection accuracy, it is desirable to remove the influence as much as possible. It is conceivable to perform sufficient cleaning treatment in the flow channel in order to completely eliminate the influence, but this may require a large amount of time.

Based on the above, an object of the present disclosure is to provide a technique for removing the influence of other beads in the verification or adjustment process using the beads for fluorescence sensitivity verification.

Note that, in the present specification, the process for removing the influence of the other particles is also referred to as a "carryover removal process".

A biological sample analyzer according to the present disclosure includes a detection unit that detects light generated by irradiating a particle with light, and an information processing unit that processes signal intensity data of the light detected by the detection unit, in which the information processing unit is configured to execute a removal process of removing signal intensity data regarding a particle group not belonging to a particle population from signal intensity data of light generated by light irradiation on a sample including the particle population including a plurality of kinds of particle groups having stepwise different fluorescence intensity levels. Moreover, in the removal process, the information processing unit executes a setting process of setting two or more of the plurality of photodetectors included in the detection unit as a fluorescence channel used to specify a particle group not belonging to the particle population.

By executing the removal process and the setting process, the influence of other beads in the verification or adjustment process using the beads for fluorescence sensitivity verification can be removed, which enables more appropriate fluorescence sensitivity verification and further contributes to improvement of the detection accuracy.

Furthermore, since the influence is removed by the removal process, the time required for the cleaning treatment can be shortened or the cleaning treatment can be simplified, and thus the execution time of the QC can be shortened.

Preferably, the information processing unit executes the setting process of the fluorescence channel so that a fluorescence intensity level of a particle group not belonging to the particle population becomes greater than any fluorescence intensity level of a plurality of kinds of particle groups included in the particle population. Therefore, the specifying process and the removal process described later can be easily executed.

Figure 7:
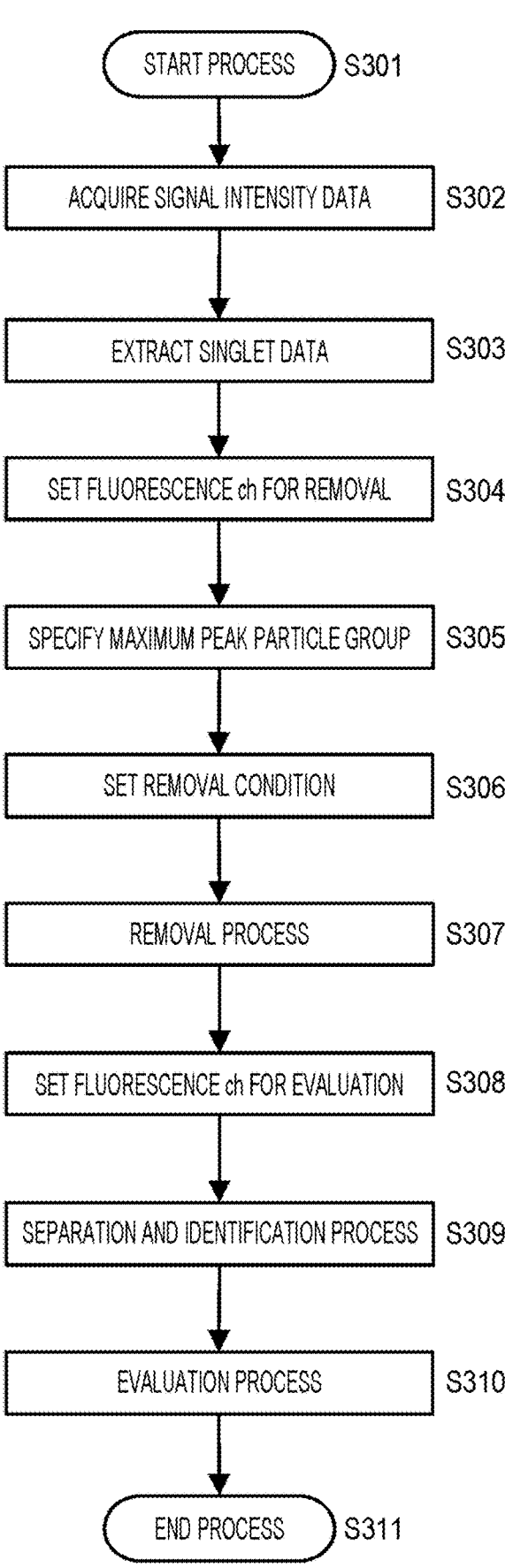
FIG. 7 is an example of a flowchart of a process executed by an information processing unit.

(3-2) Flow of Detection Unit Evaluation Process Including Carryover Removal Process An example of the process by the information processing unit described above will be described with reference to FIGS. 3 and 7. FIG. 3 is as described in (2) described above. FIG. 7 is an example of a flowchart of the process executed by the information processing unit.

In step S301 of FIG. 7, the information processing unit 103 starts the carryover removal process.

Note that, before step S301 is started, the biological sample analyzer 100 may be subjected to the verification or adjustment process of the device using the other particles (for example, beads) described above. That is, the information processing unit 103 may be configured to execute the detection unit evaluation process including the carryover removal process after the verification or adjustment process of the device by the other particles is executed. Hereinafter, the other particles are also referred to as "carryover". That is, the carryover may remain in the biological sample analyzer 100.

In step S302, the information processing unit 103 acquires signal intensity data of light generated by light irradiation on a sample including a particle population including a plurality of kinds of particle groups having stepwise different fluorescence intensity levels. In order to acquire the data, the biological sample analyzer 100 executes the flow cytometry on the sample. Therefore, event data for the sample is acquired.

In this step, the carryover may remain in the biological sample analyzer 100 (particularly in the flow channel) as described above. The carryover is a particle group not belonging to the particle population.

Furthermore, as described above, since the carryover remains in the biological sample analyzer 100 (particularly in the flow channel) as described above, the flow cytometry is also performed for the carryover in a case where the flow cytometry is performed for the sample.

Furthermore, the particle population including a plurality of kinds of particle groups having stepwise different fluorescence intensity levels may be, for example, a fluorescent bead population, and more specifically, may be a fluorescent bead population used for verification of the fluorescence sensitivity of the device. Examples of the fluorescent bead population include a bead population configured to form a plurality of peaks, such as 4-peak beads, 6-peak beads, and 8-peak beads.

In step S303, the information processing unit 103 executes an extraction process of extracting singlet data from the event data. For the extraction process, the information processing unit may generate scattered light plot data from the event data acquired by, for example, the flow cytometry, and set a predetermined gate for the scattered light plot data to extract the singlet data.

In step S304, the information processing unit 103 executes a process of setting two or more of the plurality of photodetectors included in the detection unit as the fluorescence channel used to specify the particle group (carryover) not belonging to the particle population, in the removal process to be described later.

For example, in the same step, the information processing unit executes the setting process such that the fluorescence intensity level of the carryover becomes greater than any fluorescence intensity level of the plurality of kinds of particle groups included in the particle population.

In a preferred embodiment, in step S304, the information processing unit sets two photodetectors as the fluorescence channels to be used for specifying the carryover. Preferably, in a case where two-dimensional plot data is generated on the basis of the signal intensity data acquired by the two photodetectors set as the two fluorescence channels, the information processing unit sets the two fluorescence channels such that the carryover becomes greater than any fluorescence intensity level of the plurality of kinds of particle groups included in the particle population. Each axis of the two-dimensional plot data may be a signal intensity of the fluorescence derived from a fluorescent dye assigned to the two fluorescence channels. Furthermore, the two-dimensional plot data may be two-dimensional plot data generated from the singlet data obtained by the extraction process in step S303.

Figure 8:
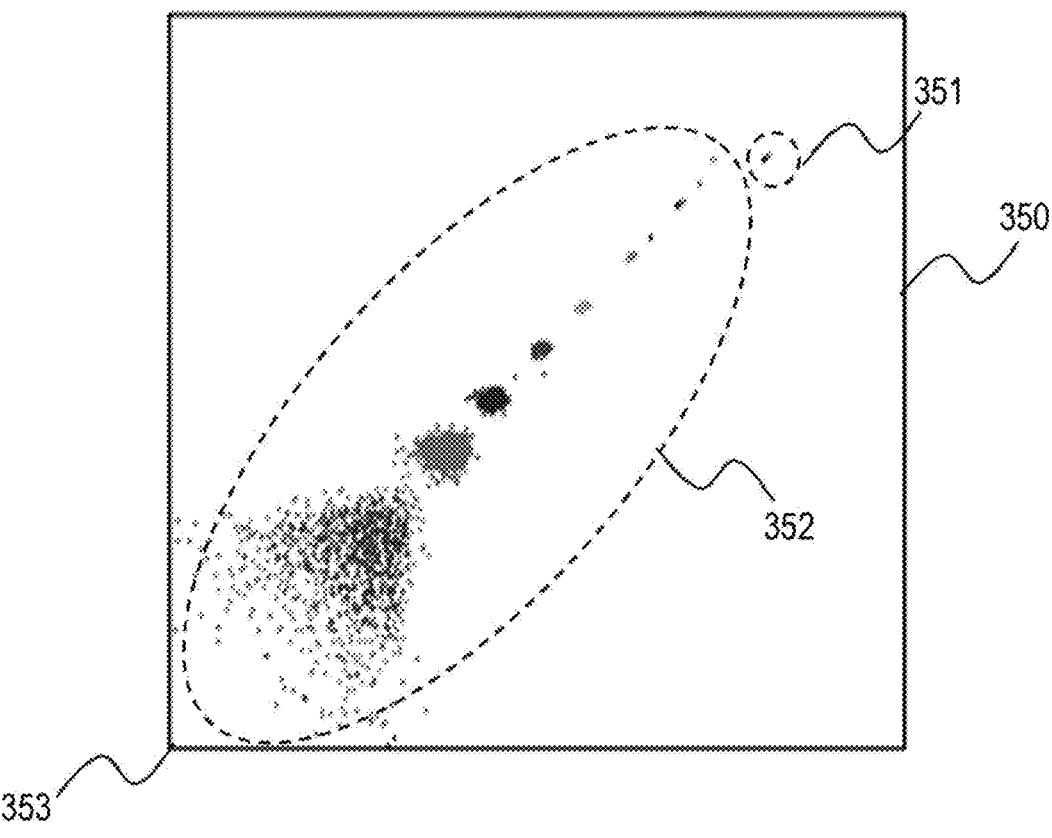
FIG. 8 illustrates an example of two-dimensional plot data generated by executing flow cytometry.

The setting of the fluorescence channel will be described below with reference to FIG. 8. FIG. 8 illustrates an example of the two-dimensional plot data generated by executing the flow cytometry. The two-dimensional plot data has fluorescence intensities of two fluorescence channels as an X axis and a Y axis, respectively.

For example, in the same step, the two fluorescence channels are set such that the plot (plot in a broken line circle indicated by reference numeral 351) of the carryover in two-dimensional plot data 350 illustrated in the figure is arranged at a position farther from an intersection point 353 of the two axes of the plot data than any plot of the plurality of kinds of particle groups (a plurality of plots in a broken line circle indicated by reference numeral 352).

In a preferred embodiment of the present disclosure, in the same step, in a case where the sum of squares of the fluorescence intensity of each axis of the two-dimensional plot data is calculated for the plurality of kinds of particle groups and the carryover, the information processing unit sets the fluorescence channel to be adopted as each axis of the two-dimensional plot data such that the sum of squares related to the carryover is greater than any of the sum of squares for the plurality of kinds of particle groups.

The characteristics related to the fluorescence of the carryover and the plurality of kinds of particle groups used for improving the detection accuracy are usually known. A person skilled in the art can specify the fluorescence channel to be appropriately set on the basis of these characteristics. Therefore, the fluorescence channel to be set may be determined in advance. For example, in a case where the verification process using the 8 Peak Beads is executed after the adjustment process using the AlignCheck Beads is executed, the FITC channel and the PE channel may be set as the two fluorescence channels.

In step S305, the information processing unit performs a specifying process of specifying signal intensity data related to a particle group having a maximum fluorescence intensity level among a plurality of kinds of particle groups constituting the particle population, from the signal intensity data acquired by the fluorescence channel. By executing the setting process and the specifying process in step S304, it is possible to appropriately discriminate between the carryover data to be removed and the data related to the plurality of kinds of particle groups not to be removed.

In a preferred embodiment, in the specifying process, the information processing unit generates a histogram of signal intensity for each of the two fluorescence channels set in step S304, and specifies a particle group having the maximum fluorescence intensity level on the basis of the histogram. The histogram may be a histogram in which the signal intensity is a class and the number of events of each signal intensity is a frequency.

Preferably, in the embodiment, the information processing unit specifies the signal intensity in which the maximum number of events is recorded (hereinafter referred to as "maximum event number signal intensity") in each of the two generated histograms. In order to specify the maximum event number signal intensity, a composition ratio of the particle group having the maximum fluorescence intensity level among the plurality of kinds of particle groups constituting the particle population may be referred to. Next, for each histogram, the information processing unit specifies the maximum signal intensity in the particle group having the maximum fluorescence intensity level on the basis of the maximum event number signal intensity. In this manner, a range of the particle group having the maximum fluorescence intensity level in each histogram is specified, and for each histogram, the maximum signal intensity in the range is specified. The sum of squares of the maximum signal intensity of each histogram may be used for a removal condition described later.

Figure 9:
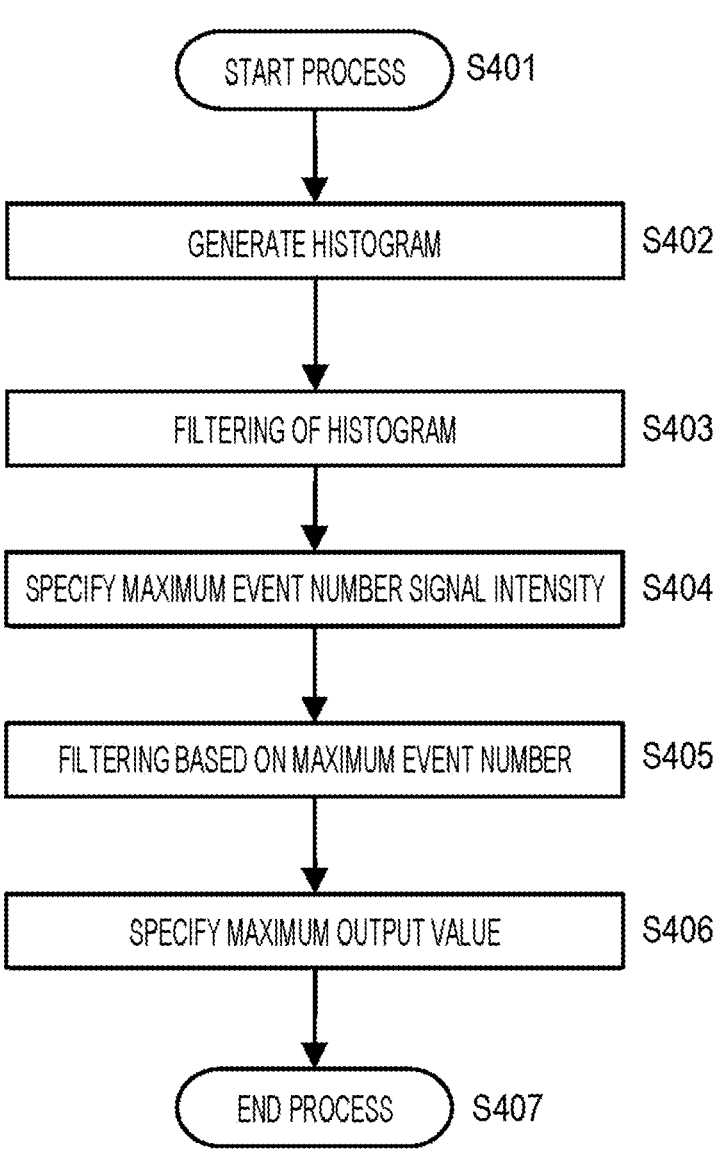
FIG. 9 is an example of a flowchart of a specifying process.
Figures 10, 11:
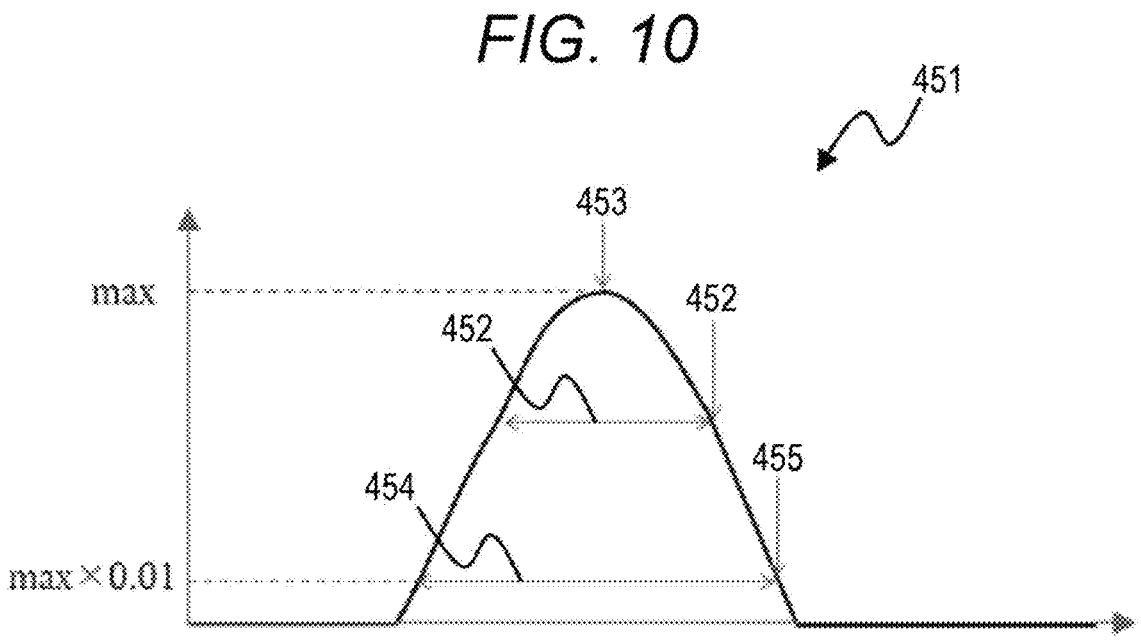
FIG. 10 is a diagram schematically illustrating a generated histogram.
FIG. 11 is a diagram for describing a region delimited by a sum of squares adopted in a removal condition.

This embodiment will be described below with reference to FIGS. 9 and 10. FIG. 9 is an example of a flowchart of the specifying process. FIG. 10 is a diagram schematically illustrating the generated histogram. The information processing unit can execute the specifying process illustrated in the flowchart for each of the two generated histograms.

In step S401, the information processing unit 103 starts the specifying process.

In step S402, the information processing unit 103 generates a histogram of the signal intensity for each of the two set fluorescence channels. The histogram is a histogram in which the signal intensity is a class and the number of events of each signal intensity is a frequency. In step S402, such a histogram is generated for each of the two fluorescence channels. A schematic diagram of the histogram is illustrated in FIG. 10, and the description will be given below with reference to this schematic diagram. Note that the schematic diagram is prepared for better understanding of the process to be executed, and may be different from an actual histogram.

In step S403, the information processing unit executes a filtering process of filtering a part of the signal intensity data acquired by the fluorescence channel using a numerical value set on the basis of a composition ratio of the particle group having the maximum fluorescence intensity level among the plurality of kinds of particle groups constituting the particle population.

For example, it is assumed that the particle population includes eight kinds of particle groups, and the composition ratios of the eight kinds of particle groups are the same. In this case, the composition ratio of the particle group having the maximum fluorescence intensity level is 12.5% (=⅛). In consideration of the presence of the carryover, in a case where the event data is arranged in order of signal intensity, a particle group having the maximum fluorescence intensity level is present within the top 13%. Next, considering the uniformity of the particles, for example, the signal intensity with the maximum number of events among the particle groups having the maximum fluorescence intensity level is present within the top 6.5% (=13%/2). Therefore, the filtering process of filtering the top 6.5% is performed. Therefore, the signal intensity with the maximum number of events can be specified.

In step S403, for example, in a histogram 451 of FIG. 10, a range indicated by an arrow 452 is filtered.

By executing the filtering process in this manner, the specifying process in next step S404 is appropriately executed.

In step S404, the information processing unit specifies the signal intensity in which the maximum number of events is recorded (maximum event number signal intensity) from the data in the range filtered in step S403.

For example, in the histogram 451 of FIG. 10, the position indicated by "max" in the vertical axis is the maximum number of events, and the signal intensity in which the maximum number of events is recorded is a value on the horizontal axis at the position indicated by an arrow 453.

As described above, in the specifying process, the information processing unit can specify the signal intensity output value with the maximum number of events among the signal intensity data related to the particle group having the maximum fluorescence intensity level.

In step S405, the information processing unit specifies the signal intensity data related to the particle group having the maximum fluorescence intensity level on the basis of the maximum event number signal intensity. In the same step, for example, the information processing unit may perform the filtering process on the particle group having the maximum fluorescence intensity level on the basis of the maximum event number signal intensity for the specification. Specifying the signal intensity data derived from the particles belonging to the particle group having the maximum fluorescence intensity level contributes to appropriate discrimination from the signal intensity data of the carryover.

For example, in the histogram, the signal intensity in which the number of events obtained by multiplying the maximum number of events by a predetermined ratio (for example, any value between 0.0001 and 0.1, in particular 0.01) is recorded is calculated and specified. The specified signal intensity is present at two places at the bottom of the mountain of the histogram. A region sandwiched between these two points is specified as a region corresponding to the signal intensity data related to the particle group having the maximum fluorescence intensity level.

In the histogram illustrated in FIG. 10, the position indicated by "max×0.01" in the vertical axis is the position of the number of events obtained by multiplying the maximum number of events by the predetermined ratio. A range corresponding to this position on the horizontal axis is indicated by an arrow 454. The range indicated by the arrow 454 is filtered as a region corresponding to the signal intensity data regarding the particle group having the maximum fluorescence intensity level.

In step S406, the information processing unit specifies a signal intensity maximum value from the signal intensity data specified in step S405. In the histogram illustrated in FIG. 10, the value on the horizontal axis at the position indicated by an arrow 455 is the signal intensity maximum value.

In step S407, the information processing unit ends the specifying process, and advances the process to step S306.

In step S306, the information processing unit sets a removal condition for removing the signal intensity data related to the particle group not belonging to the particle population on the basis of the signal intensity data related to the particle group having the maximum fluorescence intensity level.

Preferably, in step S306, the information processing unit sets the removal condition on the basis of the signal intensity maximum value among the signal intensity data related to the particle group having the maximum fluorescence intensity level.

As described above, in step S305, the signal intensity maximum value is specified from each of the two histograms as described above. The information processing unit calculates the sum of squares of the two signal intensity maximum values. The sum of squares is adopted as a threshold value adopted in the removal condition. The sum of squares separates two populations on the two-dimensional plot data as indicated by a broken line 460 in FIG. 11. Of the regions divided by the broken line 460, the upper right portion is a region where event data (that is, data of the carryover) to be removed is present.

Then, the information processing unit sets the removal condition for removing the event data in a case where the sum of squares of the event data is equal to or greater than the threshold value.

In step S307, the process of removing the signal intensity data satisfying the removal condition is performed using the removal condition set in step S306.

For example, the information processing unit calculates the sum of squares for each piece of event data. The information processing unit removes the event data in a case where the sum of squares is equal to or greater than the threshold value (or greater than the threshold value). In a case where the sum of squares is less than the threshold value (or equal to or less than the threshold value), the information processing unit does not remove the event data. The event data not removed in the latter case is used in an evaluation process in steps S308 to S310.

In step S308, two or more evaluation fluorescence channels, particularly two evaluation fluorescence channels are set for evaluating the signal intensity data after the removal process. The two evaluation fluorescence channels are preferably different from the two fluorescence channels set in step S304. The two evaluation fluorescence channels may be determined in advance for a sample including the particle population including the plurality of kinds of particle groups having the stepwise different fluorescence intensity levels.

Note that the two evaluation fluorescence channels may be the same as the two fluorescence channels set in step S304.

In step S309, the information processing unit performs a separation and identification process on the signal intensity data acquired in the two evaluation fluorescence channels set in step S308. The information processing unit specifies a population for the number of stages (or the number of types) of the plurality of kinds of particle groups having the stepwise different fluorescence intensity levels, from the signal intensity data after the removal process in step S307 by the separation and identification process. In this way, the data of the plurality of populations (populations for the same number as the number of stages) is specified from the signal intensity data after the removal process. The separation and identification process is preferably performed using the k-means method. The separation and identification process by the k-means method may be performed by a method known in the technical field, and may be performed as described in Patent Document 1 described above, for example.

For example, in a case where the particle population including a plurality of kinds of particle groups having stepwise different fluorescence intensity levels is 8-peak beads, the information processing unit specifies 8 populations from the signal intensity data after the removal process in step S307 by the separation and identification process using, for example, the k-means method.

In step S310, the information processing unit executes the evaluation process using the data of the plurality of populations specified in step S309. The information processing unit calculates, for example, a statistical value of each of the plurality of populations of data in order to execute the evaluation process. The statistical value may be, for example, a median or average fluorescence intensity (MFI) of fluorescence intensities of each population, or may be another statistical value calculated using the median and/or MFI.

The information processing unit executes the evaluation process, in particular, the evaluation process of the detection unit by using the statistical value of each of the plurality of populations of data. The evaluation may be, for example, evaluation based on information associated with information regarding sensitivity. The information associated with information regarding the sensitivity is, for example, evaluation based on linearity or fluorescence detection sensitivity (MESF). A method of calculating the information associated with information regarding the sensitivity may be performed by a method known in the technical field, and may be performed as described in Patent Document 1 described above, for example. The information processing unit calculates the information associated with information regarding the sensitivity (for example, the linearity or/and the fluorescence detection sensitivity) using the statistical value, and performs the evaluation of the detection unit on the basis of the calculated information associated with information regarding the sensitivity. For example, the linearity is evaluated to be better as the linearity is closer to 100%. Furthermore, the fluorescence detection sensitivity is evaluated to be better as the fluorescence detection sensitivity is closer to a predetermined reference value (for example, 0).

Since the separation and identification process in step S309 and the evaluation process in step S310 are executed after the carryover is removed as described above, a more appropriate evaluation result can be obtained, thereby improving the detection accuracy.

In step S311, the information processing unit ends the process.

(3-3) Specific Example of Detection Unit Evaluation Process Including Carryover Removal Process The carryover removal process described in (3-2) described above was implemented in the information processing unit of the flow cytometer. Then, an adjustment process of the flow cytometer was executed by the flow cytometer using the AlignCheck Beads. Next, the process of steps S301 to S311 described in (3-2) described above was executed using the 8 Peak Beads in a state where the carryover of the AlignCheck Beads remains in the flow cytometer. That is, the 8 Peak Beads correspond to a sample containing a particle population including a plurality of kinds of particle groups having stepwise different fluorescence intensity levels in these steps.

Specific conditions adopted in steps S301 to S311 are as follows.

In step S304, the FITC channel and the PE channel are set as the fluorescence channels used for the carryover removal process.

In step S305, steps S401 to S407 described above are executed. Among these steps, in step S403, since the 8 Peak Beads each contain eight kinds of particle groups at a composition ratio of 12.5%, the filtering process of filtering the top 6.5% was performed. In step S405, the signal intensity in which the number of events obtained by multiplying the maximum number of events by 0.01 as the predetermined ratio was recorded was specified.

In step S306, the sum of squares of the signal intensity maximum value specified from each of the histograms of the FITC channel and the PE channel is calculated, and the sum of squares is adopted as the threshold value adopted in the removal condition. The information processing unit set the removal condition for removing the event data in a case where the sum of squares of the event data was equal to or greater than the threshold value.

In step S307, the process of removing the signal intensity data satisfying the removal condition was performed using the removal condition set in step S306.

In step S308, the VioGreen channel and the PE channel were set as two evaluation fluorescence channels for evaluating the signal intensity data after the removal process.

Figure 12A:
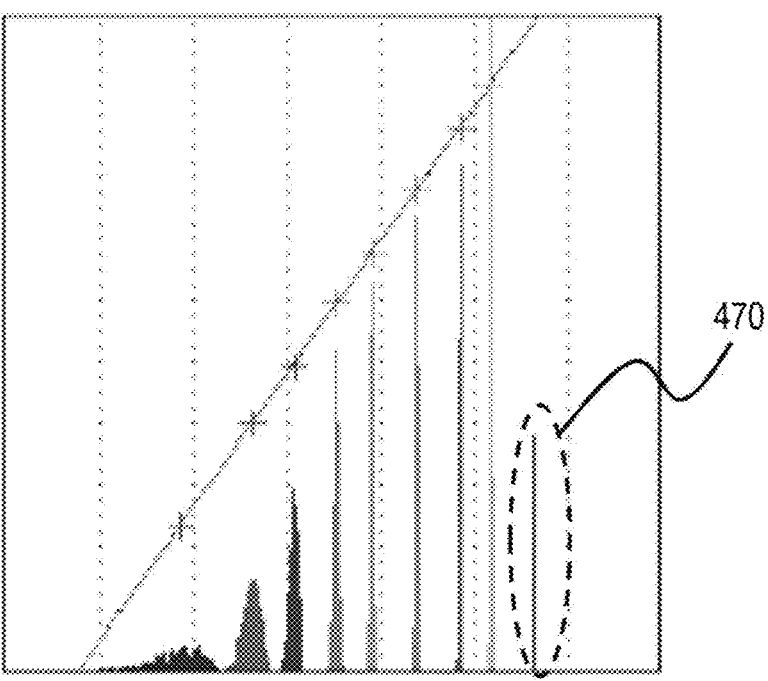
FIG. 12A is a view illustrating an evaluation result obtained by a separation and identification process.
Figure 12B:
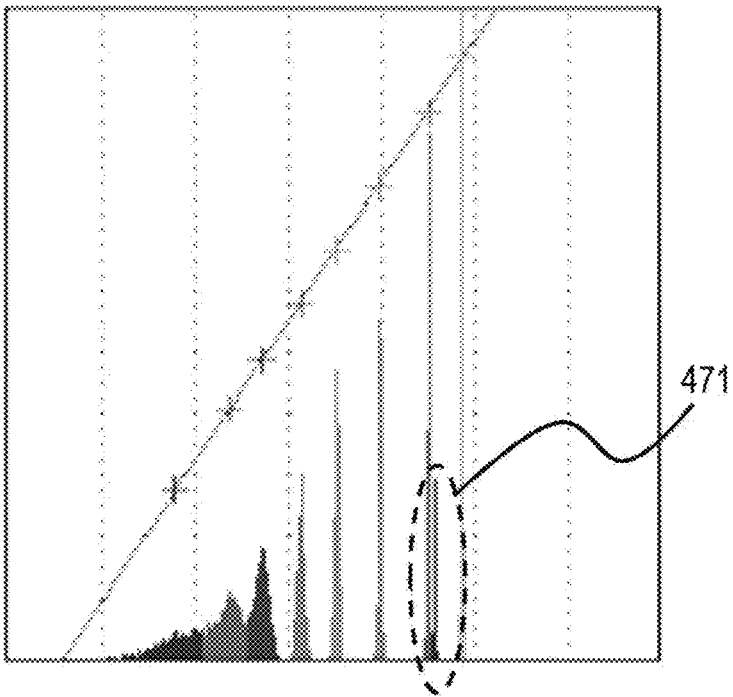
FIG. 12B is a view illustrating an evaluation result obtained by a separation and identification process.
Figure 13:
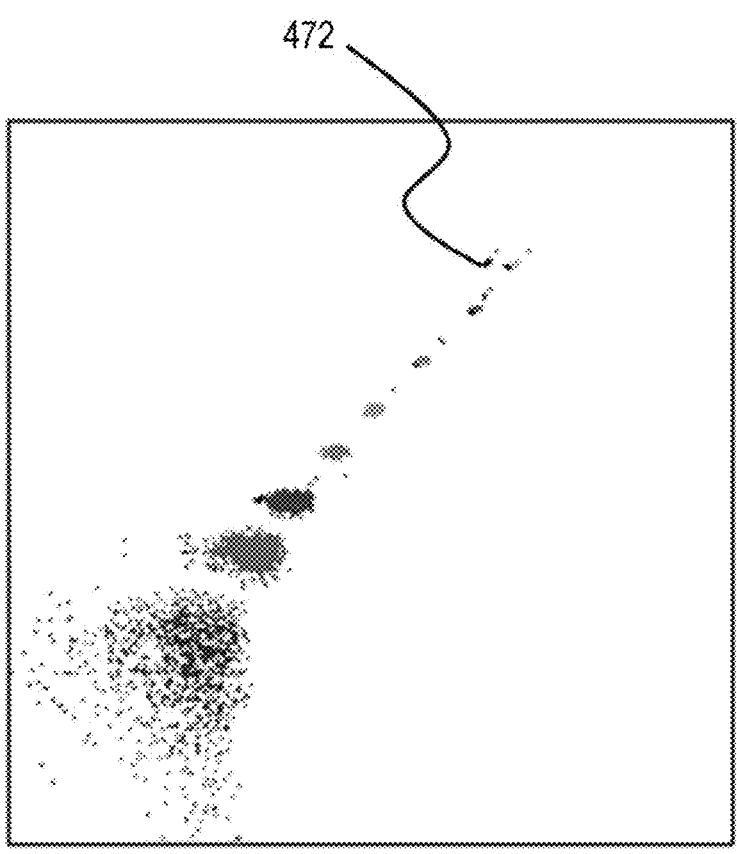
FIG. 13 is two-dimensional plot data with VioGreen and PE on an X axis and a Y axis, respectively

In step S309, the separation and identification process was performed. The separation and identification process was performed by the k-means method. FIGS. 12A and 12B illustrate evaluation results for a plurality of populations specified by the separation and identification process. In these figures, the Y axis represents the number of events. The X axis is the signal intensity in the FITC channel and the signal intensity in the VioGreen channel, respectively. Furthermore, FIG. 13 illustrates two-dimensional plot data with VioGreen and PE as the X axis and the Y axis, respectively. From these figures, it can be seen that the peaks of the eight kinds of particle groups of 8 Peak Beads are appropriately specified. Furthermore, although the carryover is indicated by reference numerals 470, 471, and 472 in these drawings, it can be checked that the carryover has been removed and the separation and identification process has been performed.

(4) Mode in which (2) and (3) Described Above are Executed

The biological sample analyzer of the present disclosure may execute both the linearity correction process described in (2) described above and the evaluation process including the carryover removal process described in (3) described above. The biological sample analyzer may execute the evaluation process including the carryover removal process after executing the linearity correction process. Therefore, the detection accuracy is improved by the linearity correction process, and the carryover in the linearity correction process is removed by the carryover removal process, so that the evaluation process can be appropriately executed.

That is, the present disclosure also provides the biological sample analyzer including:

a light irradiation unit that irradiates a particle with light;

a detection unit that detects light generated by the light irradiation; and an information processing unit that controls the light irradiation unit and the detection unit, in which the information processing unit executes a correction process of correcting a signal intensity measurement value of the light detected by the detection unit on the basis of a relationship between a light irradiation output value of the light irradiation unit and a signal intensity measurement value of the light detected by the detection unit, and the information processing unit is configured to execute a removal process of removing signal intensity data related to a particle group not belonging to a particle population including a plurality of kinds of particle groups having stepwise different fluorescence intensity levels, from signal intensity data of light generated by irradiating a sample including the particle population with light.

In the removal process, the information processing unit may execute a setting process of setting two or more of the plurality of photodetectors included in the detection unit as a fluorescence channel used to specify a particle group not belonging to the particle population.

Note that, the present disclosure can also have the following configurations.

[1]

A biological sample analyzer including:

a light irradiation unit that irradiates a particle with light;

a detection unit that detects light generated by the light irradiation; and an information processing unit that controls the light irradiation unit and the detection unit, in which the information processing unit corrects a signal intensity measurement value of the light detected by the detection unit on the basis of a relationship between a light irradiation output value of the light irradiation unit and a signal intensity measurement value of the light detected by the detection unit.

[2]

The biological sample analyzer described in [1], in which the information processing unit is configured to execute the correction using an n-th order approximation formula indicating the relationship, and n in the n-th order approximation formula is an odd number equal to or greater than 3.

[3]

The biological sample analyzer described in [2], in which the information processing unit creates a first-order approximation formula indicating a relationship between a light irradiation output value equal to or less than a predetermined value and a signal intensity measurement value acquired in a case of the light irradiation output value, and acquires a data group for generating the n-th order approximation formula using the first-order approximation formula.

[4]

The biological sample analyzer described in [3], in which the information processing unit acquires a correlation index of the first-order approximation formula.

[5]

The biological sample analyzer described in [4], in which the information processing unit determines whether or not the correlation index satisfies a predetermined condition.

[6]

The biological sample analyzer described in any one of [3] to [5], in which the information processing unit generates the n-th order approximation formula by using a data group including a pair of the signal intensity measurement value acquired in the case of the light irradiation output value equal to or greater than the predetermined value and a signal intensity calculation value calculated by substituting the light irradiation output value into the first-order approximation formula.

[7]

The biological sample analyzer described in any one of [3] to [6], in which the information processing unit determines whether to correct the signal intensity measurement value using a signal intensity calculation value calculated using the first-order approximation formula as a threshold value in a case where the light irradiation output value is the predetermined value.

[8]

The biological sample analyzer described in any one of [1] to [7], in which the detection unit includes one or more MPPCs as detectors that detect the light.

[9]

A biological sample analyzer including:

a detection unit that detects light generated by irradiating a particle with light; and an information processing unit that processes signal intensity data of the light detected by the detection unit, in which the information processing unit is configured to execute a removal process of removing signal intensity data related to a particle group not belonging to a particle population including a plurality of kinds of particle groups having stepwise different fluorescence intensity levels, from signal intensity data of light generated by irradiating a sample including the particle population with light, and in the removal process, the information processing unit executes a setting process of setting two or more of a plurality of photodetectors included in the detection unit as a fluorescence channel used to specify a particle group not belonging to the particle population.

[10]

The biological sample analyzer described in [9], in which the information processing unit executes the setting process of the fluorescence channel such that a fluorescence intensity level of the particle group not belonging to the particle population becomes greater than any fluorescence intensity level of the plurality of kinds of particle groups included in the particle population.

[11]

The biological sample analyzer described in [9] or [10], in which in the removal process, the information processing unit executes a specifying process of specifying signal intensity data related to a particle group having a maximum fluorescence intensity level among the plurality of kinds of particle groups constituting the particle population, from the signal intensity data acquired by the fluorescence channel.

[12]

The biological sample analyzer described in [11], in which in the specifying process, the information processing unit specifies a signal intensity output value with a maximum number of events among the signal intensity data related to the particle group having the maximum fluorescence intensity level.

[13]

The biological sample analyzer described in [12], in which in the specifying process, the information processing unit specifies signal intensity data related to the particle group having the maximum fluorescence intensity level on the basis of the signal intensity output value with the maximum number of events.

[14]

The biological sample analyzer described in any one of [11] to [13], in which in the removal process, the information processing unit sets a removal condition for removing signal intensity data related to the particle group not belonging to the particle population on the basis of the signal intensity data related to the particle group having the maximum fluorescence intensity level.

[15]

The biological sample analyzer described in [14], in which the information processing unit sets the removal condition on the basis of a maximum value of the signal intensity output value among the signal intensity data related to the particle group having the maximum fluorescence intensity level.

[16]

The biological sample analyzer described in any one of [9] to [15], in which the information processing unit further executes a setting process of setting two or more of the plurality of photodetectors included in the detection unit as a fluorescence channel used to evaluate signal intensity data after the removal process is executed.

[17]

The biological sample analyzer described in [16], in which the information processing unit executes a separation and identification process on the signal intensity data after the removal process is executed, by a k-means method.

REFERENCE SIGNS LIST

100 Biological sample analyzer
101 Light irradiation unit
102 Detection unit
103 Information processing unit

The invention claimed is:

1. A biological sample analyzer comprising:

a light irradiation unit that irradiates a particle with light;

a detection unit that detects light generated by the light irradiation; and an information processing unit that controls the light irradiation unit and the detection unit, wherein the information processing unit corrects a signal intensity measurement value of the light detected by the detection unit on a basis of a relationship between a light irradiation output value of the light irradiation unit and a signal intensity measurement value of the light detected by the detection unit;

wherein the information processing unit is configured to execute the correction using an n-th order approximation formula indicating the relationship, and n in the n-th order approximation formula is an odd number equal to or greater than 3; and wherein the information processing unit creates a first-order approximation formula indicating a relationship between a light irradiation output value equal to or less than a predetermined value and a signal intensity measurement value acquired in a case of the light irradiation output value, and acquires a data group for generating the n-th order approximation formula using the first-order approximation formula.

2. The biological sample analyzer according to claim 1, wherein the information processing unit acquires a correlation index of the first-order approximation formula.

3. The biological sample analyzer according to claim 2, wherein the information processing unit determines whether or not the correlation index satisfies a predetermined condition.

4. The biological sample analyzer according to claim 1, wherein the information processing unit generates the n-th order approximation formula by using a data group including a pair of the signal intensity measurement value acquired in the case of the light irradiation output value equal to or greater than the predetermined value and a signal intensity calculation value calculated by substituting the light irradiation output value into the first-order approximation formula.

5. The biological sample analyzer according to claim 1, wherein the information processing unit determines whether to correct the signal intensity measurement value using a signal intensity calculation value calculated using the first-order approximation formula as a threshold value in a case where the light irradiation output value is the predetermined value.

6. The biological sample analyzer according to claim 1, wherein the detection unit includes one or more MPPCs as detectors that detect the light.

7. A biological sample analyzer comprising:

a detection unit that detects light generated by irradiating a particle with light; and an information processing unit that processes signal intensity data of the light detected by the detection unit, wherein the information processing unit is configured to execute a removal process of removing signal intensity data related to a particle group not belonging to a particle population including a plurality of kinds of particle groups having stepwise different fluorescence intensity levels, from signal intensity data of light generated by irradiating a sample including the particle population with light, and in the removal process, the information processing unit executes a setting process of setting two or more of a plurality of photodetectors included in the detection unit as a fluorescence channel used to specify a particle group not belonging to the particle population, wherein the information processing unit is configured to execute the correction using an n-th order approximation formula indicating the relationship, and n in the n-th order approximation formula is an odd number equal to or greater than 3, and wherein the information processing unit creates a first-order approximation formula indicating a relationship between a light irradiation output value equal to or less than a predetermined value and a signal intensity measurement value acquired in a case of the light irradiation output value, and acquires a data group for generating the n-th order approximation formula using the first-order approximation formula.

8. The biological sample analyzer according to claim 7, wherein the information processing unit executes the setting process of the fluorescence channel such that a fluorescence intensity level of the particle group not belonging to the particle population becomes greater than any fluorescence intensity level of the plurality of kinds of particle groups included in the particle population.

9. The biological sample analyzer according to claim 7, wherein in the removal process, the information processing unit executes a specifying process of specifying signal intensity data related to a particle group having a maximum fluorescence intensity level among the plurality of kinds of particle groups constituting the particle population, from the signal intensity data acquired by the fluorescence channel.

10. The biological sample analyzer according to claim 9, wherein in the specifying process, the information processing unit specifies a signal intensity output value with a maximum number of events among the signal intensity data related to the particle group having the maximum fluorescence intensity level.

11. The biological sample analyzer according to claim 10, wherein in the specifying process, the information processing unit specifies signal intensity data related to the particle group having the maximum fluorescence intensity level on a basis of the signal intensity output value with the maximum number of events.

12. The biological sample analyzer according to claim 9, wherein in the removal process, the information processing unit sets a removal condition for removing signal intensity data related to the particle group not belonging to the particle population on a basis of the signal intensity data related to the particle group having the maximum fluorescence intensity level.

13. The biological sample analyzer according to claim 12, wherein the information processing unit sets the removal condition on a basis of a maximum value of the signal intensity output value among the signal intensity data related to the particle group having the maximum fluorescence intensity level.

14. The biological sample analyzer according to claim 7, wherein the information processing unit further executes a setting process of setting two or more of the plurality of photodetectors included in the detection unit as a fluorescence channel used to evaluate signal intensity data after the removal process is executed.

15. The biological sample analyzer according to claim 14, wherein the information processing unit executes a separation and identification process on the signal intensity data after the removal process is executed, by a k-means method.

* * * * *